(12) United States Patent
Roos et al.

(10) Patent No.: US 7,560,848 B2
(45) Date of Patent: Jul. 14, 2009

(54) ELECTRICAL MACHINE WITH COMMUTATOR ROTOR

(75) Inventors: Gerald Roos, Achern (DE); Michael Strupp, Rheinstetten (DE); Gerlinde Ambach, Bodolz (DE)

(73) Assignee: Robert Bosch GmbH, Stuttgart (DE)

( * ) Notice: Subject to any disclaimer, the term of this patent is extended or adjusted under 35 U.S.C. 154(b) by 379 days.

(21) Appl. No.: 10/584,769

(22) PCT Filed: Nov. 15, 2004

(86) PCT No.: PCT/DE2004/002515

§ 371 (c)(1),
(2), (4) Date: Jun. 28, 2006

(87) PCT Pub. No.: WO2005/064774

PCT Pub. Date: Jul. 14, 2005

(65) Prior Publication Data
US 2007/0152532 A1    Jul. 5, 2007

(30) Foreign Application Priority Data
Dec. 30, 2003    (DE)    ............... 103 61 811

(51) Int. Cl.
H02K 13/04    (2006.01)
(52) U.S. Cl. ............... 310/234; 310/233; 310/71
(58) Field of Classification Search ......... 310/233–236, 310/179, 184, 198, 261, 264, 132–149, 71
See application file for complete search history.

(56) References Cited

U.S. PATENT DOCUMENTS

| 4,292,559 | A  | * | 9/1981  | Auinger et al. ............. 310/206 |
| 4,876,472 | A  |   | 10/1989 | Shiraki et al. |
| 6,694,599 | B1 | * | 2/2004  | Kershaw et al. ............... 29/597 |
| 6,841,914 | B2 | * | 1/2005  | Maeda et al. ............... 310/198 |
| 6,888,285 | B2 | * | 5/2005  | Ito et al. ..................... 310/233 |
| 2004/0256944 | A1 | * | 12/2004 | Kaneko ...................... 310/233 |
| 2005/0184612 | A1 | * | 8/2005  | Cros et al. .................. 310/158 |
| 2005/0206268 | A1 | * | 9/2005  | Walter et al. ................ 310/225 |

FOREIGN PATENT DOCUMENTS

| CH | 551 097   | 6/1974 |
| JP | 10174403  | 6/1998 |

* cited by examiner

Primary Examiner—Thanh Lam
(74) Attorney, Agent, or Firm—Ronald E. Greigg

(57) ABSTRACT

An electrical machine having at least four exciter poles in the stator and having a commutator rotor, which has a number of slots pole teeth on its circumference that is greater than the number of exciter poles, and having twice as large a number of commutator laminations, which via at least two carbon brushes serve to supply current to coils which are each wound on one of the pole teeth, and contact bridges each joined together diametrically opposed laminations. When there is an even number of slots, pole teeth and coils, the beginning and end of one coil of the coils disposed on adjacent pole teeth is connected directly to the laminations adjacent to one another, and the beginning and end of the other coil is connected via one of the contact bridges to the laminations adjacent to one another.

19 Claims, 3 Drawing Sheets

ELECTRICAL MACHINE WITH COMMUTATOR ROTOR

CROSS-REFERENCE TO RELATED APPLICATIONS

This application is a 35 USC 371 application of PCT/DE 2004/002515 filed on Nov. 15, 2004.

BACKGROUND OF THE INVENTION

1. Field of the Invention

The invention relates to an improved electrical machine having at least four exciter poles in the stator and having a commutator rotor with a greater number of slots and pole teeth on its circumference than the number of exciter poles.

2. Description of the Prior Art

From German Patent DE 197 57 279 C1, it is known, in a quadrupole electric motor, to use a commutator rotor with twelve commutator laminations and twelve coils connected to them, in order to attain low torque ripple and good commutation. The diametrically opposed laminations are joined together via contact bridges, in order to make the power supply to the rotor symmetrical and to assure it with only one pair of brushes. The contact bridges are produced upon winding of the coils by first winding one coil from one lamination and then, via the adjacent lamination, with the coil wire laying a contact bridge to the diametrically opposite lamination and then from there in alternation to produce the further coils and contact bridges. The rotor coils are produced in pairs on diametrically opposed sides with two so-called flyers, and the contact bridges are then formed by rotating the rotor 180°. In such machines, especially for small structural sizes, it is quite complicated to wind the high number of coils into the slots of the rotor. Moreover, the coils, wound around three pole teeth, intersect at the winding caps, which makes for a large protrusion of the winding caps. Moreover, because of the high winding pitch over three slots, long winding cap connections result, which are expensive in terms of material and also lead to high heat losses.

From U. S. Pat. No. 4,532,449, an electrical machine with a commutator rotor is also known, in which the number of rotor coils is only half as large as the number of commutator laminations. In this reference, five coils are supplied from one pair of brushes via ten laminations. The coils are continuously wound as single-tooth windings, by skipping one pole tooth from one coil to the next. The beginning and end of the coils are each contacted with laminations between each of which one lamination remains free. These free laminations, for supplying current to the coils, are connected via contact bridges to the laminations diametrically opposite them, which are in contact with the coils. This provision has the disadvantage that because of the two carbon brushes offset from one another by 90°, the commutation events are chronologically staggered, and as a result the commutating coils on the one hand cause radially acting forces, which can lead to noise production as well as unilateral loads on the rotor bearing, with correspondingly greater bearing wear. Moreover, because of increased lamination tension when there are ten instead of twelve laminations, increased brush fire occurs, which can impair the service life of the commutator and hence also the service life of the machine.

With the present solution to this problem, the object, in electrical machines whose number of rotor coils is only half as large as the number of laminations, is to improve the commutation and make it possible to produce the electrical machines, even in small structural sizes, without coil intersections at the winding caps.

SUMMARY AND ADVANTAGES OF THE INVENTION

The electrical machine according the invention has the advantage that as a result of the novel association of the coils with the laminations, the coils, as single-tooth coils, on the one hand have an only slight axial winding cap length and protrusion, and on the other, together with the contact bridges, better commutation and hence a longer service life are attained.

Advantageous features and refinements of the basic machine are disclosed. For instance, with a view to high torque development, an especially favorable distribution of flux in the coils is obtained because the coils that are adjacent as viewed in one direction of rotation are placed with their beginnings and ends on the laminations that are adjacent as viewed in the other direction of rotation. Expediently, the beginnings and ends of the adjacent coils are placed in alternation directly and indirectly, respectively, on adjacent laminations via one of the contact bridges. It is also advantageous for the production of the coils by automatic winders if the coils disposed on adjacent pole teeth are each connected directly or indirectly in series with one another via one of the contact bridges. Preferably, the adjacent coils are connected in series with one another in alternation directly and via one of the contact bridges, respectively. In an especially simple way, all the coils and contact bridges are produced continuously from one winding wire, and expediently the coils and contact bridges are continuously wound in alternation by means of automatic winders.

To enable laying the contact bridges on the winding caps of the coils in as orderly a way as possible, it is proposed that at least one of the contact bridges, and preferably all the contact bridges, are shifted from the commutator side of the rotor, through its slots, to the side of the rotor facing away from the commutator. In order for the contact bridges on the back side of the rotor not to be damaged by a bearing mounted there, they are expediently guided around at least one and at most two adjacent teeth of the rotor. In order to guide the beginning and end of the coils onto the respective laminations of the commutator as well in as orderly a way as possible, it is also proposed that the beginning and end of every other coil be laid from the commutator side through adjacent slots to the back side of the rotor. The winding plan for all the coils and contact bridges is advantageously embodied such that all the coils and contact bridges can be continuously wound on the rotor by means of a so-called flyer or a so-called needle.

BRIEF DESCRIPTION OF THE DRAWINGS

The invention is described in further detail as examples below, in conjunction with the drawings, in which.

DESCRIPTION OF THE PREFERRED EMBODIMENTS

Figure 1:
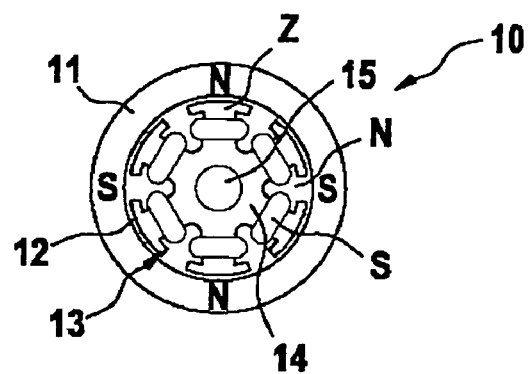
FIG. 1 shows an electrical machine according to the invention in a front end elevation view.

In FIG. 1, in a front elevation view, a permanent-magnetically excited quadrupole direct current motor is shown as an electrical machine and identified by reference numeral 10. Such machines are preferably employed for final control elements and the like in motor vehicles and must function reliably, if at all possible over the entire service life of the vehicle, under heavy loads. Accordingly, their construction must be as sturdy as possible. The electrical machine 10 has a quadrupole stator 11, which cooperates via a working air gap 12 with a commutator rotor 13, hereinafter called the rotor. The rotor 13 comprises a lamination packet 14, which is secured to a rotor shaft 15 that is supported on both sides. Six uniformly distributed pole teeth Z are disposed on the circumference of the lamination packet 14, and between each of them there are respective slots N for receiving six coils S. The coils S are produced as single-tooth coils, each around one pole tooth Z, by automatic winders. The coils S are wired in a special way to a commutator, which is placed on the rotor shaft 15 on the back side of the lamination packet 14.

Figure 2:
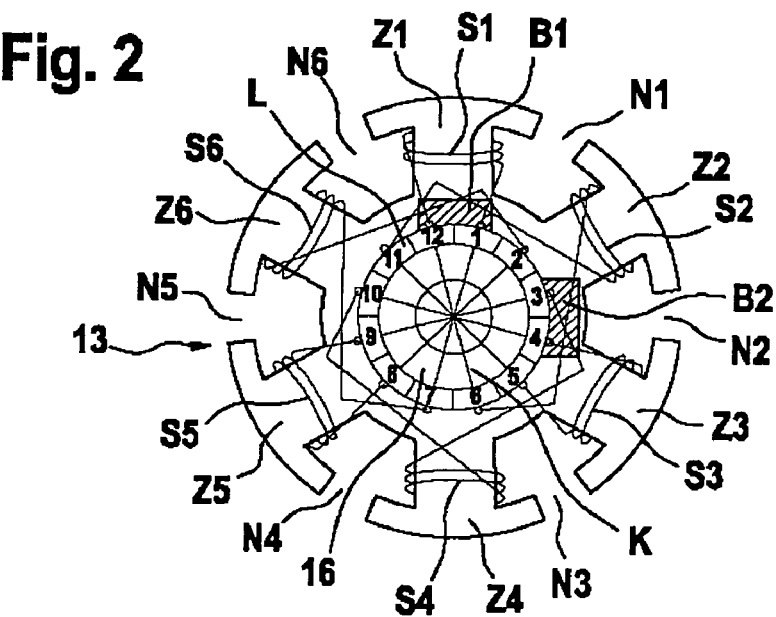
FIG. 2 shows a first exemplary embodiment with the rotor of the machine of FIG. 1 in an enlarged view, with six coils on six pole teeth and one commutator with twelve laminations and two brushes.

FIG. 2, in a first exemplary embodiment of the invention, schematically shows the rotor 13 from the back in an enlarged view. A commutator 16 is located there, with twelve laminations L distributed uniformly over the circumference and cooperating with two stationary carbon brushes B1 and B2. The carbon brushes are offset from one another by 90° and are supplied with direct current for the operation of the electrical machine. To make the power supply to the rotor symmetrical in a quadrupole machine and to assure this with only one pair of brushes, the respective laminations L diametrically opposite one another in the commutator 16 are each joined together via separate contact bridges K. There, the six coils are designated S1 through S6, the six pole teeth are designated Z1 through Z6, and the six slots are designated N1 through N6.

For a favorable magnetic flux through the rotor by means of the six coils S, an even number of coils is of importance; this is because, given the simultaneous commutation of what are now coils S diametrically opposite one another, the radial force components caused by the commutation at the diametrically opposed teeth Z add up to zero. Moreover, for attaining the highest possible torque development on the rotor circumference, the wiring of the coils S to the commutator laminations L is of importance. It is provided that, of the coils S located on adjacent pole teeth Z, the beginning and end of one coil S is connected directly to adjacent laminations L, and the beginning and end of the other coil S is connected to adjacent laminations L via one of the contact bridges K. Moreover, the coils S located on adjacent pole teeth Z are each connected in series with one another in alternation directly and indirectly, respectively, via one of the contact bridges K.

For the sake of the strongest possible development of the rotor torque, it is also of importance that the coils S adjacent one another as viewed in one direction of rotation are laid with their beginnings and ends on the respective laminations L adjacent one another as viewed in the other direction of rotation. This is done in the same way for all three exemplary embodiments, in which the adjacent coils S are joined together in alternation directly and indirectly via one of the contact bridges K.

Figure 3:
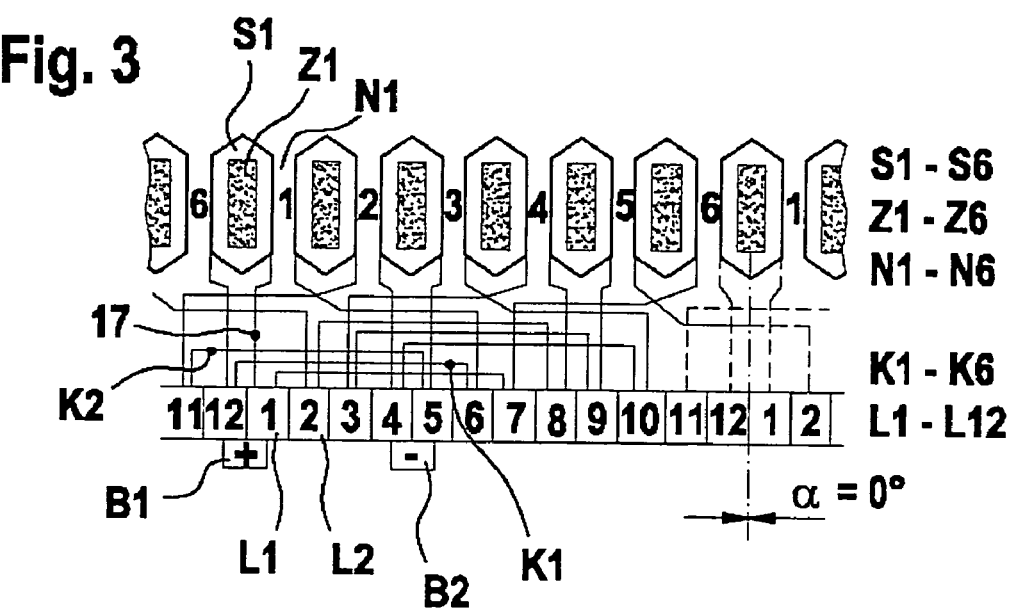
FIG. 3 shows the winding plan for the rotor of FIG. 2.

For further explanation of the coil wiring to the commutator 16, FIG. 3 shows the winding plan for the coils S1 through S6 of the rotor 13 of FIG. 2. For explaining the winding plan of FIG. 3, Winding Table 1 will be used, which can be input into a controller of an automatic winder for automatically producing the six coils S1 through S6 and the six contact bridges K1 through K6 as well as their contacting with the laminations L1 through L12 of the commutator 16.

WINDING TABLE 1

| S/K | Lamination | | Slot | Winding | Slot | | Lamination |
|-----|-----------|---|------|---------|------|---|-----------|
| S1  | 1  | > | 1 | 42 | 6 | > | 12 |
| K1  | 12 | > |   |    |   | > | 6  |
| S2  | 6  | > | 1 | 42 | 2 | > | 11 |
| K2  | 11 | > |   |    |   | > | 5  |
| S3  | 5  | > | 3 | 42 | 2 | > | 4  |
| K3  | 4  | > |   |    |   | > | 10 |
| S4  | 10 | > | 3 | 42 | 4 | > | 3  |
| K4  | 3  | > |   |    |   | > | 9  |
| S5  | 9  | > | 5 | 42 | 4 | > | 8  |
| K5  | 8  | > |   |    |   | > | 2  |
| S6  | 2  | > | 5 | 42 | 6 | > | 7  |
| K6  | 7  | > |   |    |   | > | 1  |

It can be seen from Winding Table 1 that all six coils S and contact bridges K are meant to be produced continuously from one coil wire. It can also be seen that the coils S and contact bridges K there are wound continuously in alternation. Specifically, the procedure is as follows:

Beginning with the coil S1 in FIGS. 2 and 3, the winding wire 17 is first secured to the lamination L1; then the beginning of the coil S1 is laid through the slot N1, then 42 windings are wound around the pole tooth Z1, and then the coil end is secured through the slot N6 to the lamination L12. Next, without interrupting the coil wire, the first contact bridge K1 is laid from the lamination L12 to lamination L6. From there, the beginning of coil S2 is laid through the slot N1; the coil S2 is wound with 42 windings around the tooth Z2, and the end is passed through slot N2 to the lamination L11. Next, from there, the contact bridge K2 is laid from the lamination L11 to the lamination L5. From there, the beginning of the coil S3 is then laid through the slot N3; the coil is wound with 42 windings around the tooth Z3; and the end is laid through the slot N2 to the lamination L4. The bridge K3 then follows from the lamination L4 to the lamination L10. Next, the beginning of the coil S4 is laid from lamination L10 through the slot N3; the coil is wound with 42 windings around the tooth Z4; and the end is laid through the slot N4 onto lamination L3. The contact bridge K4 then follows from the lamination L3 to the lamination L9. From there, the beginning of the coil S5 is laid through the slot N5; the coil is wound with 42 windings on the pole tooth Z5; and the coil end is laid through slot N4 onto lamination L8. The contact bridge K5 then follows from the lamination L8 to lamination L2. Next, the coil S6 is laid with its beginning from the lamination L2 through the slot N5, and wound with 42 windings onto the pole tooth Z6, and the end is laid through the slot N6 onto lamination L7. Finally, the contact bridge K6 is then also laid from the lamination L7 onto lamination 1. The winding wire is finally severed here. For better clarity, the slots N and laminations L are numbered consecutively in FIG. 3.

On the commutator 16 of the rotor of FIG. 2, the contact bridges K can also be produced separately and wired to the respective diametrically opposed laminations. In that case, the six coils S are also produced simultaneously, individually, in pairs, or in groups of three, and contacted with their laminations L. For this case, Winding Table 2 shows the corresponding sequence of steps for an automatic winder:

WINDING TABLE 2

| S/K | Lamination | | Slot | Winding | Slot | | Lamination |
|---|---|---|---|---|---|---|---|
| S1 | 1 | > | 1 | 42 | 6 | > | 12 |
| S2 | 6 | > | 1 | 42 | 2 | > | 11 |
| S3 | 5 | > | 3 | 42 | 2 | > | 4 |
| S4 | 10 | > | 3 | 42 | 4 | > | 3 |
| S5 | 9 | > | 5 | 42 | 4 | > | 8 |
| S6 | 2 | > | 5 | 42 | 6 | > | 7 |

Here, the beginning of the coil S1 is wound from lamination L1 through the slot N1 with 42 windings around the tooth Z1, and the end is laid through the slot 6 onto lamination L12, where the winding wire 17 is capped. The beginning of the coil S2 is then laid from the lamination L6 through slot N1; the coil is wound with 42 windings onto tooth Z2, and the end is laid through the slot N2 onto lamination L11. The beginning of the coil S3 is now laid from L5 through the slot N3; the coil is wound with 42 windings onto the tooth Z3, and the end is laid through the slot N2 onto lamination L4. The beginning of the coil S4 is laid from lamination 10 through the slot N3; the coil is wound with 42 windings around the tooth Z4 and the end is laid through the slot N4 onto lamination L3. The beginning of the coil S5 is laid from the lamination L9 through the slot N5; the coil is wound with 42 windings around the tooth Z5; and the end is laid through the slot N5 onto lamination L8. Finally, the coil S6 is also laid with its beginning from the lamination L2 through the slot N5, and wound with 42 windings around the tooth Z6, and the end is laid through the slot N6 onto lamination L7. The coils S1, S3 and S5 and the coils S2, S4, S6 can also each be produced simultaneously by means of a suitable automatic winder, since their windings with the laminations associated with them are all the same, as can be seen from FIGS. 2 and 3.

Figure 4:
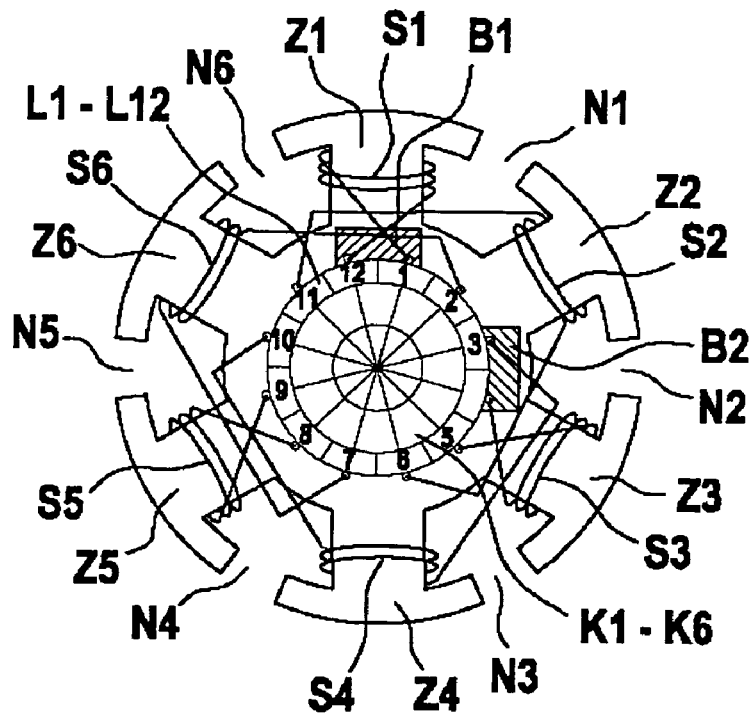
FIG. 4 shows a second exemplary embodiment the rotor of FIG. 2, but with coils wired differently.
Figure 5:
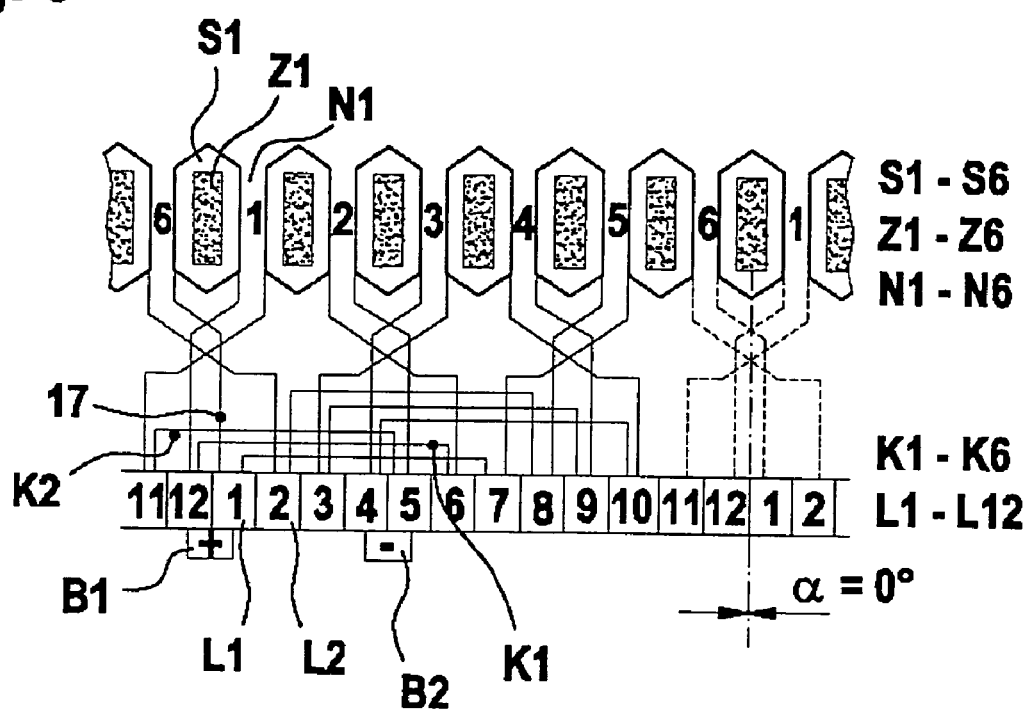
FIG. 5 shows the corresponding winding plan for the embodiment of FIG. 4.

In FIG. 4, as a second exemplary embodiment, the same rotor 13 is shown, with six pole teeth Z, six coils S, and twelve laminations L on the commutator 16; however, the coils S are wired to the laminations L in a different sequence. This can be seen from the winding plan shown in FIG. 5, which will now be described in further detail with the aid of Winding Table 3 for the six coils S and contact bridges K of FIGS. 4 and 5. All the coils S1 through S6 and contact bridges K1 through K6 can be produced continuously by an automatic winder in accordance with this winding table. The procedure should be as follows:

WINDING TABLE 3

| S/K | Lamination | | Slot | Winding | Slot | | Lamination |
|---|---|---|---|---|---|---|---|
| S1 | 1 | > | 6 | 42 | 1 | > | 12 |
| K1 | 12 | > | | | | > | 6 |
| S2 | 6 | > | 2 | 42 | 1 | > | 11 |
| K2 | 11 | > | | | | > | 5 |
| S3 | 5 | > | 2 | 42 | 3 | > | 4 |
| K3 | 4 | > | | | | > | 10 |
| S4 | 10 | > | 4 | 42 | 3 | > | 3 |

WINDING TABLE 3-continued

| S/K | Lamination | | Slot | Winding | Slot | | Lamination |
|---|---|---|---|---|---|---|---|
| K4 | 3 | > | | | | > | 9 |
| S5 | 9 | > | 4 | 42 | 5 | > | 8 |
| K5 | 8 | > | | | | > | 2 |
| S6 | 2 | > | 6 | 42 | 5 | > | 7 |
| K6 | 7 | > | | | | > | 1 |

The winding wire 17 is first secured to the lamination L1, and the beginning of the coil S1 is then laid from the lamination Li through the slot N6; the coil is wound with 42 windings onto the pole tooth Z1; and the end is laid through the slot N1 onto the lamination L12. Without interruption, the contact bridge K1 now follows from the lamination L12 to the lamination L6. After that, the coil S2 is wound with its beginning from the lamination L6 through the slot N2 with 42 windings around the tooth Z2, and the end is laid through the slot N1 onto the lamination L11. Next, the contact bridge K2 follows, from the lamination L11 to the lamination L5. Then the beginning of the coil S3 is laid from the lamination L5 through the slot N2; the coil is wound with 42 windings onto the pole tooth Z3; and the end is laid through the slot N3 onto the lamination L4. After that, the contact bridge K3 is laid from the lamination L4 onto the lamination L10. Now the beginning of the coil S4 is laid from the lamination L10 through the slot N4; the coil is wound with 42 windings around the pole tooth Z4; and the end is laid through the slot N3 onto the lamination L3. The contact bridge K4 follows from the lamination L3 onto the lamination L9. Then the coil S5 is laid with its beginning from the lamination L9 through the slot N4; the coil is wound with 42 windings onto the pole tooth Z5; and the end is laid through the slot N5 onto the lamination L8. The coil S6 is now shifted with its beginning from the lamination L2 through the slot N6 and then wound with 42 windings around the pole tooth Z6, and the end is laid through the slot N5 onto the lamination L7. Finally, the contact bridge K6 also follows, which is laid from the lamination L7 to the lamination L1. The rotor winding is now complete, and the winding wire 17 is capped on the lamination L1.

Figure 6:
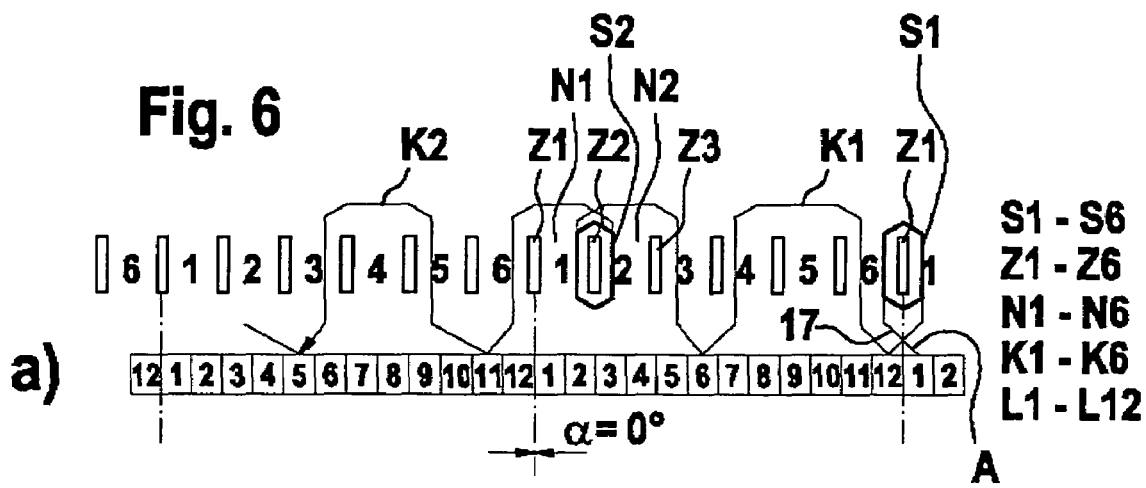
FIG. 6 shows, as a third exemplary embodiment, a three-part winding plan for the six coils of one rotor of FIG. 2, with a further variant of the wiring.
Figure 6:
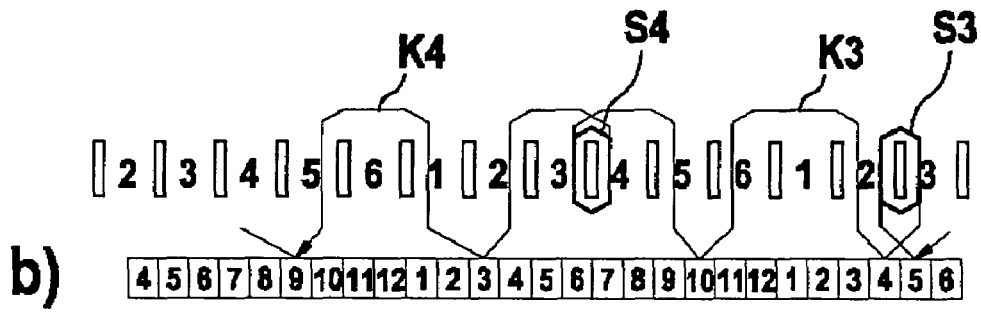
Figure 6:
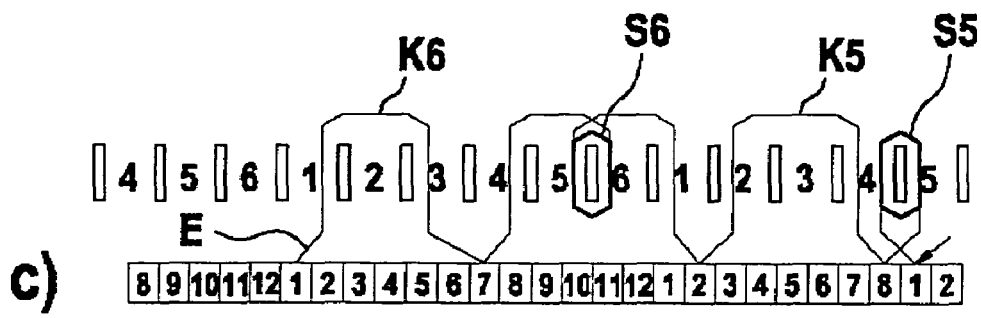

In FIG. 6, a further exemplary embodiment is shown for the wiring of the coils S and contact bridges K on the rotor 13 of FIG. 2. FIG. 6 shows the winding plan, which for greater clarity is broken down into portions a, b and c. Portion a shows a first winding pass with the coils S1 and S2 and the contact bridges K1 and K2. The portion b shows a further, ensuing winding pass with the coils S3 and S4 and the contact bridges K3 and K4. The portion c, finally, shows the then-ensuing final winding pass with the coils S5 and S6 and the contact bridges K5 and K6. It can be seen here that the beginnings and ends of the coils are laid in part, and the contact bridges K are laid completely, away from the commutator side through slots N onto the side of the rotor 13 facing away from the commutator. The contact bridges K are wrapped around two pole teeth Z each on the back side of the rotor. In this exemplary embodiment as well, all the coils S and contact bridges K are meant to be produced in a continuously wound way with a winding wire 17 by means of automatic winders, which will now be explained with the aid of Winding Table 4. In accordance with the winding plan of FIG. 6, the winding table is also broken down below into portions corresponding to winding plan portions a b and c. Accordingly, the following sequence of steps results:

WINDING TABLE 4

| S/K | Lam. |   | Slot | Wdg. | Slot | Slot | Wdg. | Slot | Wdg. | Slot |   | Lam. |
|-----|------|---|------|------|------|------|------|------|------|------|---|------|
| S1  | 1    | > | 6    | 42   | 1    |      |      |      |      |      | > | 12   |
| K1  | 12   | > | 6    | 1    | 4    |      |      |      |      |      | > | 6    |
| S2  | 6    | > | 3    | 1/2  | 1    | 2    | 41   | 2    | 1/2  | 6    | > | 11   |
| K2  | 11   | > | 5    | 1    | 3    |      |      |      |      |      | > | 5    |
| S3  | 5    | > | 2    | 42   | 3    |      |      |      |      |      | > | 4    |
| K3  | 4    | > | 2    | 1    | 6    |      |      |      |      |      | > | 10   |
| S4  | 10   | > | 5    | 1/2  | 3    | 4    | 41   | 4    | 1/2  | 2    | > | 3    |
| K4  | 3    | > | 1    | 1    | 5    |      |      |      |      |      | > | 9    |
| S5  | 9    | > | 4    | 42   | 5    |      |      |      |      |      | > | 8    |
| K5  | 8    | > | 4    | 1    | 2    |      |      |      |      |      | > | 2    |
| S6  | 2    | > | 1    | 1/2  | 5    | 6    | 41   | 6    | 1/2  | 4    | > | 7    |
| K6  | 7    | > | 3    | 1    | 1    |      |      |      |      |      | > | 1    |

First, in portion a of the winding plan, the winding wire 17 is put in contact with the lamination L1, and the beginning A of the coil S1 is laid in the slot N6, and after that 42 windings are wound around the tooth Z1, and then the end is laid through the slot N1 onto the lamination L12. The contact bridge K1 now follows, which is laid from the lamination L12 through the slot N6 to the back side of the rotor and from there is passed through the slot N4 to the lamination L6. From the lamination L6, the coil S2 is now passed with its beginning through the slot N3 to the back side of the rotor and from there to the slot N1; then via the slot N2, 41 windings are wound onto the pole tooth Z2, and finally, the end is laid from the slot N2 via the back side of the rotor to the slot N6 and from there finally to the lamination L11. The bridge K2 now follows, which is passed from the lamination L11 through the slot N5 to the back side of the rotor and from there via two teeth is passed back through the slot N3 and to the lamination L5. This is then continued in portion b of the winding plan from the lamination L5. From there, the beginning of the coil S3 is passed through the slot N2, and the coil is wound with 42 windings around the pole tooth Z3; the end is laid through the slot N3 onto the lamination L4. The contact bridge K3 follows, which is laid from the lamination L4 through the slot N2 onto the back side of the rotor, is passed from there via two teeth Z through the slot N6, and is then laid onto the lamination L10. The coil S4 follows, which is passed with its beginning from the lamination L10 through the slot N5 and on to the back side of the rotor to the slot N3, then through the slot N4 is wound with 41 windings around the tooth Z4; the end is then transferred from the slot N4 to the slot N2 via the back side of the rotor and finally is laid on the lamination L3. The contact bridge K4 follows, which is passed from the lamination L3 via the slot N1 to the back side of the rotor and from there via two pole teeth Z is laid through the slot N5 to the lamination L9. In the third portion c of the winding plan, the coil S5 then follows; first, the beginning is laid from the lamination L9 through the slot N4; the coil is wound with 42 windings; and then the end is laid through the slot N5 onto the lamination L8. From there, the contact bridge K5 follows, which is passed from the lamination L8 through the slot N4 to the back side of the rotor and from there across two pole teeth Z is passed through the slot N2 and laid on the lamination L2. The coil S6 now follows, whose beginning is passed from the lamination L2 through the slot N1 to the back side of the rotor and from there, via the slot N5 and the slot N6, is wound with 41 windings around the tooth Z6, and the end is laid from the slot N6 via the back side of the rotor through the slot N4 onto the lamination L7. Finally, the contact bridge K6 is now also passed from the lamination L7 through the slot N3 onto the back side of the rotor and from there is passed back again through the slot N1 via two pole teeth Z. From there, the end E of the winding wire then reaches the lamination L1 again.

The special feature of the exemplary embodiment of FIG. 6 is that there, not only are the contact bridges K shifted away from the commutator side toward the back side of the rotor, but also in the same way, the beginning and end of every other coil are shifted through respective adjacent slots on to the side of the rotor facing away from the commutator. As a result, on the commutator side, an optimal wire guidance is attained, because there the winding wire is passed along the shortest course in each case from the laminations to a slot.

The invention is not limited to the exemplary embodiments shown, since the coils can be wired in the most various ways to the laminations of the commutator. For instance, the coils and contact bridges may also be produced in reverse order by automatic winders. The contact bridges may also be produced separately on the commutator if needed. It can furthermore be expedient for the commutator 16 to be secured relative to the slots of the rotor 13 in a way that is more or less markedly offset in one or the other direction on the rotor shaft 15, so that between the pole tooth Z1 and the lamination slit between the lamination L1 and the lamination 12, a more or less large offset angle α occurs, so that in this way, favorable connections in production terms can be achieved between the rotor laminations and the coils. In the exemplary embodiments, an offset angle α=0° is achieved. Since the contact bridges K each join laminations L diametrically opposite from one another to one another, the contact bridges can selectively be wrapped in one direction or the other around the rotor, as can be seen in the exemplary embodiments of FIGS. 3 and 5. The same is correspondingly true, however, for the contact bridges which are shifted to the back side of the rotor as in the exemplary embodiment of FIG. 6. It is furthermore also possible for these contact bridges to be passed back to the commutator side not via two pole teeth as in FIG. 6, but via only one pole tooth each, through the adjacent slot.

The invention is also not limited to quadrupole machines, since in the same way, even eight-and twelve-pole machines can be equipped with a commutator rotor, in which from the twelve or eighteen coils, the various adjacent coils are laid in alternation onto adjacent laminations either directly or via a contact bridge.

The foregoing relates to a preferred exemplary embodiment of the invention, it being understood that other variants and embodiments thereof are possible within the spirit and scope of the invention, the latter being defined by the appended claims.

The invention claimed is:

1. An electrical machine having at least four exciter poles in the stator and having a commutator rotor which has a number of slots and pole teeth on its circumference, which number is greater than the number of exciter poles, having a number of commutator laminations which is twice as large as the number of pole teeth, and having at least one pair of stationary carbon brushes which are offset from one another by a pole pitch of the exciter pole and cooperate with the laminations of the commutator for supplying current to coils which are each wound onto one of the pole teeth, and the diametrically opposed laminations are each joined together via contact bridges, the improvement wherein, there is an even number of slots, pole teeth and coils, the beginning and end of one of the coils disposed on adjacent pole teeth is connected directly to a pair of laminations adjacent to one another, and the beginning and end of the other coil is connected via one of the contact bridges to a lamination adjacent to the pair of laminations adjacent to one another.

2. An electrical machine having at least four exciter poles in the stator and having a commutator rotor which has a number of slots and pole teeth on its circumference, which number is greater than the number of exciter poles, having a number of commutator laminations which is twice as large as the number of pole teeth, and having at least one pair of stationary carbon brushes which are offset from one another by a pole pitch of the exciter pole and cooperate with the laminations of the commutator for supplying current to coils which are each wound onto one of the pole teeth, and the diametrically opposed laminations are each joined together via contact bridges, the improvement wherein, when there is an even number of slots, pole teeth and coils, the beginning and end of one of the coils disposed on adjacent pole teeth is connected directly to the laminations adjacent to one another, and the beginning and end of the other coil is connected via one of the contact bridges to the laminations adjacent to one another. wherein the coils adjacent to one another in terms of one direction of rotation are laid with their beginnings and ends on laminations that are adjacent to one another in the other direction of rotation.

3. The electrical machine as recited in claim 2, wherein the beginnings and ends of the adjacent coils are laid in alternation directly and indirectly, respectively, on adjacent laminations via a contact bridge.

4. An electrical machine having at least four exciter poles in the stator and having a commutator rotor which has a number of slots and pole teeth on its circumference, which number is greater than the number of exciter poles, having a number of commutator laminations which is twice as large as the number of pole teeth, and having at least one pair of stationary carbon brushes which are offset from one another by a pole pitch of the exciter pole and cooperate with the laminations of the commutator for supplying current to coils which are each wound onto one of the pole teeth, and the diametrically opposed laminations are each joined together via contact bridges, the improvement wherein, when there is an even number of slots, pole teeth and coils, the beginning and end of one of the coils disposed on adjacent pole teeth is connected directly to the laminations adjacent to one another, and the beginning and end of the other coil is connected via one of the contact bridges to the laminations adjacent to one another wherein the coils disposed on adjacent pole teeth are each connected directly or indirectly in series with one another via one of the contact bridges.

5. The electrical machine as recited in claim 2, wherein the coils disposed on adjacent pole teeth are each connected directly or indirectly in series with one another via one of the contact bridges.

6. The electrical machine as recited in claim 3, wherein the coils disposed on adjacent pole teeth are each connected directly or indirectly in series with one another via one of the contact bridges.

7. The electrical machine as recited in claim 4, wherein the adjacent coils are connected in alternation directly and via the contact bridge respectively, in series with one another.

8. The electrical machine as recited in claim 5, wherein the adjacent coils are connected in alternation directly and via the contact bridge respectively, in series with one another.

9. The electrical machine as recited in claim 6, wherein the adjacent coils are connected in alternation directly and via the contact bridge respectively, in series with one another.

10. The electrical machine as recited in claim 7, wherein all of the coils and contact bridges are produced continuously with one winding wire.

11. The electrical machine as recited in claim 8, wherein all of the coils and contact bridges are produced continuously with one winding wire.

12. The electrical machine as recited in claim 9, wherein all of the coils and contact bridges are produced continuously with one winding wire.

13. The electrical machine as recited in claim 10, wherein the coils and contact bridges are wound continuously in alternation.

14. The electrical machine as recited in claim 11, wherein the coils and contact bridges are wound continuously in alternation.

15. The electrical machine as recited in claim 12, wherein the coils and contact bridges are wound continuously in alternation.

16. The electrical machine as recited in claim 10, wherein at least one of the contact bridges, and preferably all the contact bridges, are shifted from the commutator side of the rotor, through its slots, to the side of the rotor facing away from the commutator.

17. The electrical machine as recited in claim 13, wherein at least one of the contact bridges, and preferably all the contact bridges, are shifted from the commutator side of the rotor, through its slots, to the side of the rotor facing away from the commutator.

18. The electrical machine as recited in claim 10, wherein the beginning and end of every other coil are laid from the commutator side through adjacent slots to the side of the rotor facing away from the commutator.

19. The electrical machine as recited in claim 10, wherein all the coils and contact bridges can be wound continuously by means of automatic winders, in particular by means of so-called flyers or needles.

* * * * *